(12) United States Patent
Hunt et al.

(10) Patent No.: US 9,500,226 B2
(45) Date of Patent: Nov. 22, 2016

(54) METHOD AND SYSTEMS FOR TEXTURING LIQUID BEARING SURFACES IN X-RAY TUBES

(71) Applicant: General Electric Company, Schenectady, NY (US)

(72) Inventors: Ian Strider Hunt, Sussex, WI (US); Kenwood P. Dayton, Mequon, WI (US); Ben David Poquette, Wauwatosa, WI (US); Santosh Kumar Tiwari, Bangalore (IN); Michael J. Danyluk, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 181 days.

(21) Appl. No.: 14/459,231

(22) Filed: Aug. 13, 2014

(65) Prior Publication Data

US 2016/0047415 A1    Feb. 18, 2016

(51) Int. Cl.
  *H01J 35/00*  (2006.01)
  *F16C 33/10*  (2006.01)
  *H01J 35/10*  (2006.01)

(52) U.S. Cl.
  CPC ......... *F16C 33/1065* (2013.01); *H01J 35/101* (2013.01); *H01J 2235/108* (2013.01); *H01J 2235/1066* (2013.01)

(58) Field of Classification Search
  CPC .............. F16C 33/1065; H01J 35/101; H01J 2234/108; H01J 2235/1066
  USPC .................................................. 378/132, 133
  See application file for complete search history.

(56) References Cited

U.S. PATENT DOCUMENTS

| | | | |
|---|---|---|---|
| 5,077,776 A | * | 12/1991 | Vetter .................. H01J 35/101 378/119 |
| 5,384,818 A | | 1/1995 | Ono et al. |
| 5,504,797 A | | 4/1996 | Vetter |
| 5,654,999 A | | 8/1997 | Gemmel et al. |
| 2012/0106712 A1 | | 5/2012 | Hunt et al. |

FOREIGN PATENT DOCUMENTS

| | | |
|---|---|---|
| EP | 1094491 B1 | 12/2007 |
| JP | 1193946 A | 4/1999 |
| WO | 2008153089 A1 | 12/2008 |

OTHER PUBLICATIONS

Zhang, X. et al., "Hydrophobicity at a Janus Interface," Science Magazine, vol. 295, No. 5555, pp. 663-666, Jan. 2002, 4 pages.
(Continued)

*Primary Examiner* — Courtney Thomas
(74) *Attorney, Agent, or Firm* — Alleman Hall McCoy Russell & Tuttle LLP

(57) ABSTRACT

Various methods and systems are provided for providing coatings and textures to surfaces of a bearing assembly in an x-ray system to control the wettability of the surfaces when components of the bearing assembly rotate during operation of the x-ray system. A lubricant is disposed in a gap formed between a shaft and a sleeve of the bearing assembly such that textured and coated surfaces of the shaft and sleeve alter wetting properties between the lubricant and surfaces. The coatings and textures can be wetting or anti-wetting to further enhance control over the behavior of the lubricant.

20 Claims, 12 Drawing Sheets

(56) References Cited

OTHER PUBLICATIONS

Spikes, H., "Slip at the Wall—Evidence and Tribological Implications," Tribological Research and Design for Engineering Systems: Proceedings of the 29th Leeds-Lyon Symposium, vol. 41, pp. 525-535, Jul. 2003, 11 pages.

Li, W. et al., "The Partially Wetted Bearing—Extended Reynolds Equation," Tribology International, vol. 39, No. 11, pp. 1428-1435, Nov. 2006, 8 pages.

Hsieh, C. et al., "Superhydrophobicity from Composite Nano/Microstructures: Carbon Fabrics Coated with Silica Nanoparticles," Surface and Coatings Technology, vol. 202, No. 24, pp. 6103-6108, Published: Aug. 2008, Available online: Jul. 19, 2008, 6 pages.

Hunt, Ian S., "Liquid Bearing Assembly and Method of Constructing Same," U.S. Appl. No. 13/906,944, filed May 31, 2013, 34 pages.

Hunt, Ian S. "SGG Textured Surfaces: Sealing Liquid Metal," General Electric PowerPoint Presentation, May 2014, 11 pages.

"Wetting," Wikipedia.com, https://en.wikipedia.org/wiki/Wetting, Accessed May 20, 2014, 16 pages.

* cited by examiner

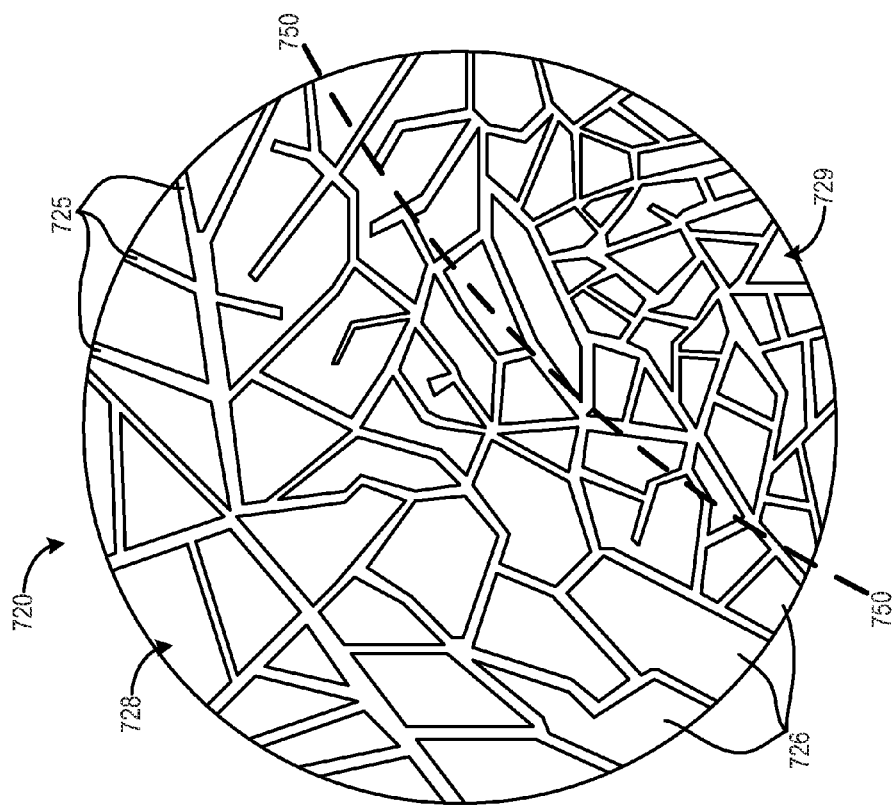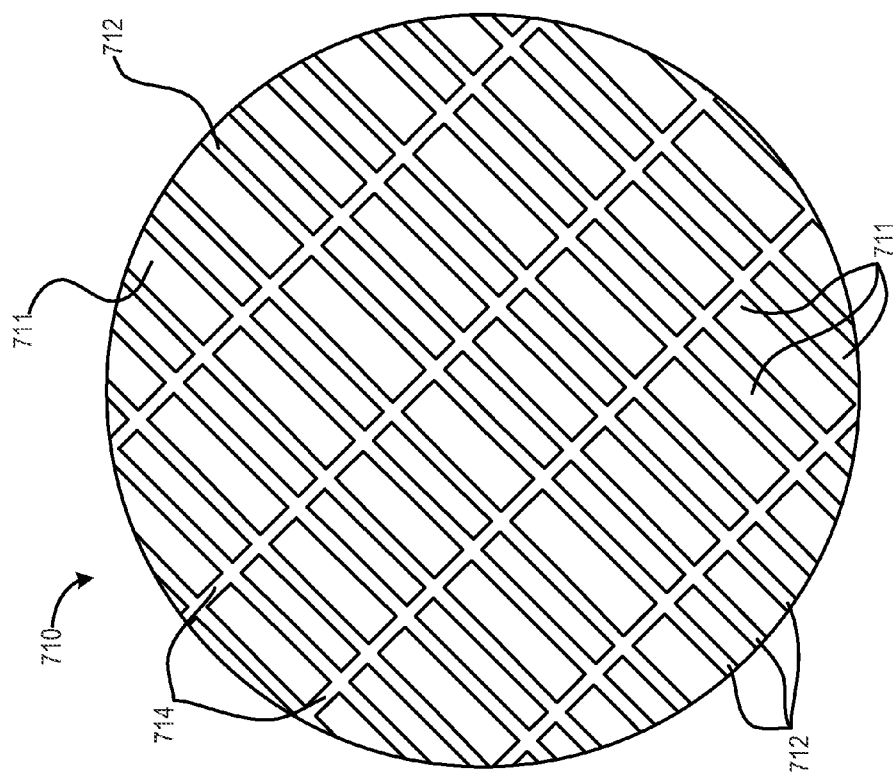
FIG. 7

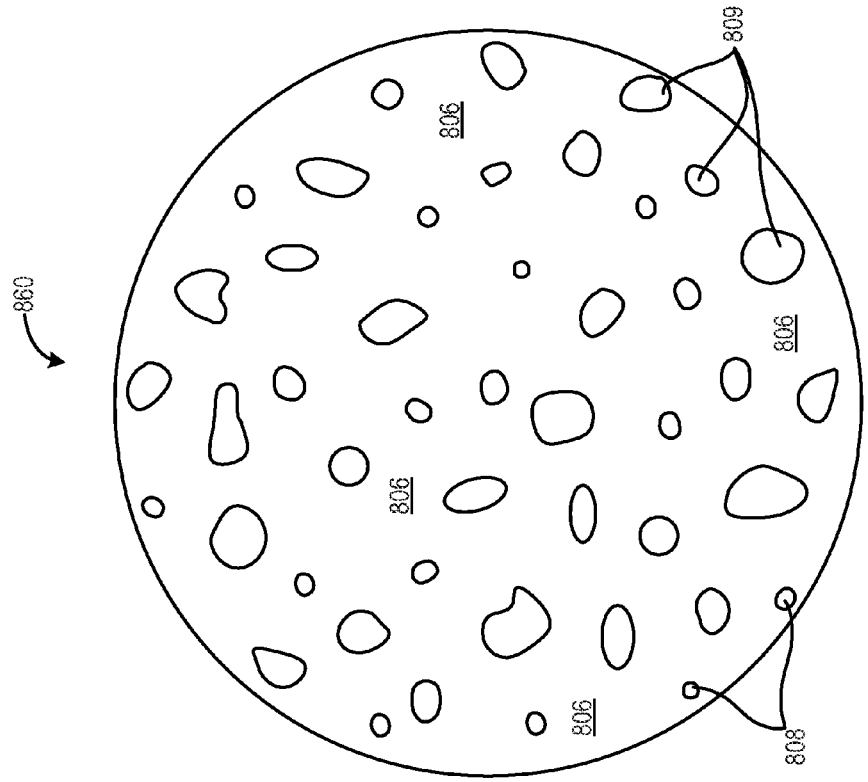
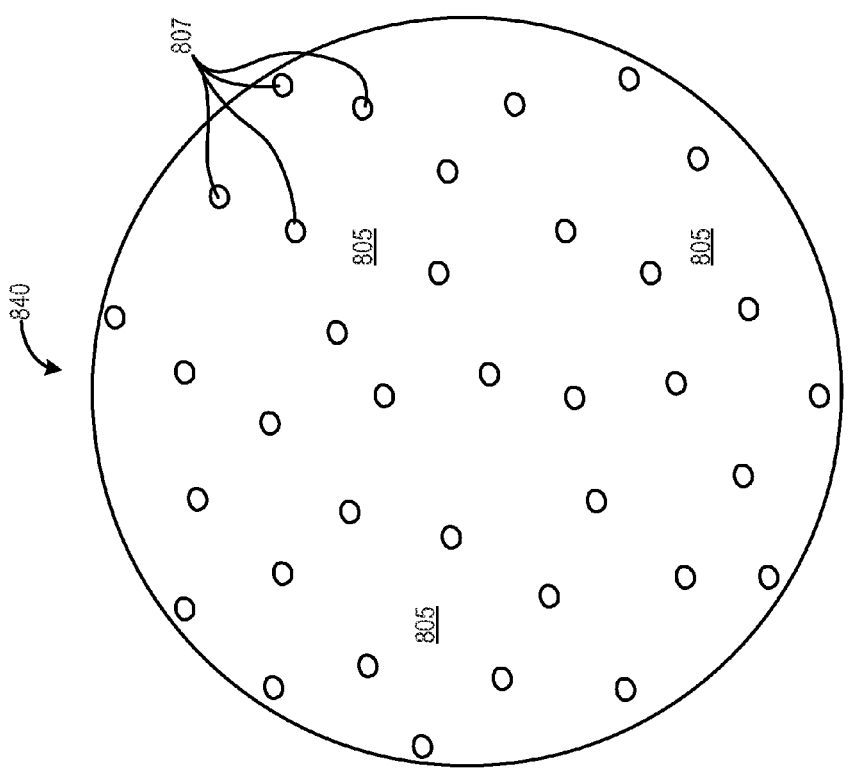
FIG. 8

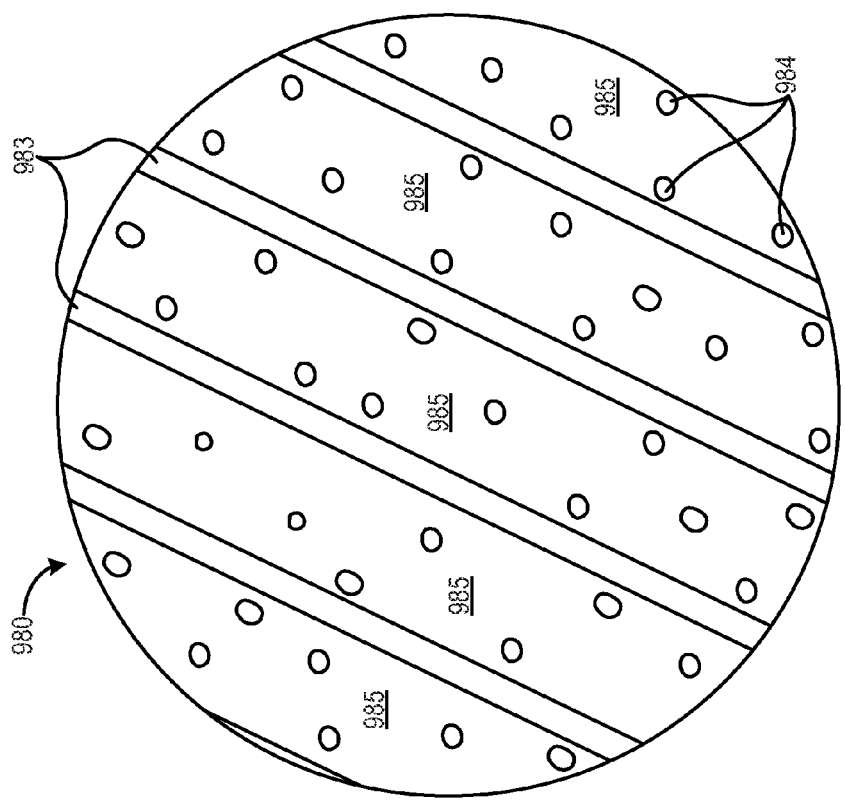
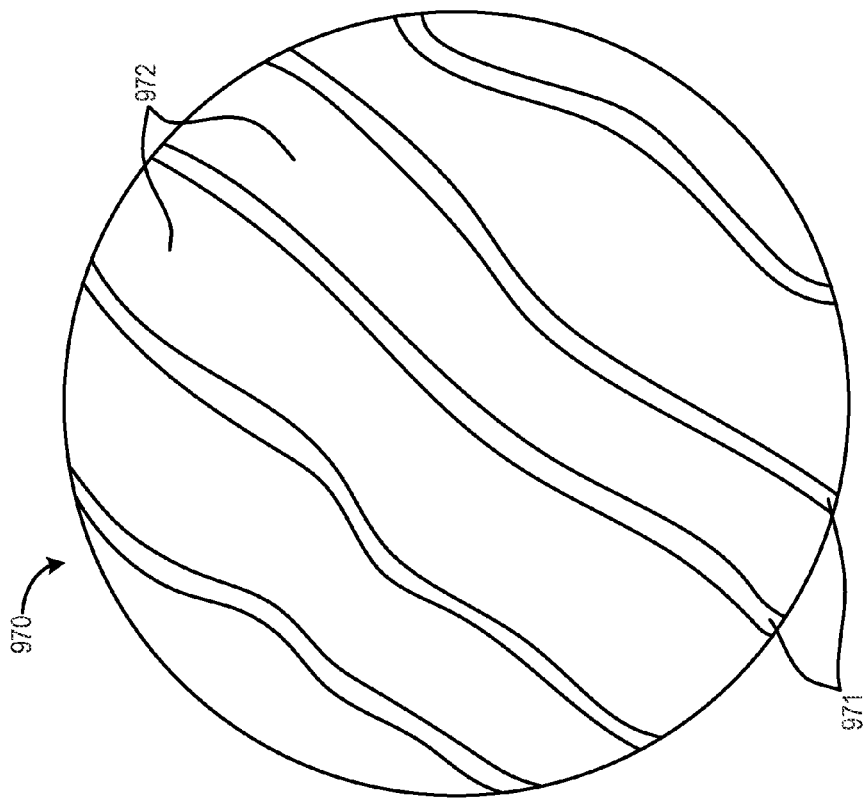
FIG. 9

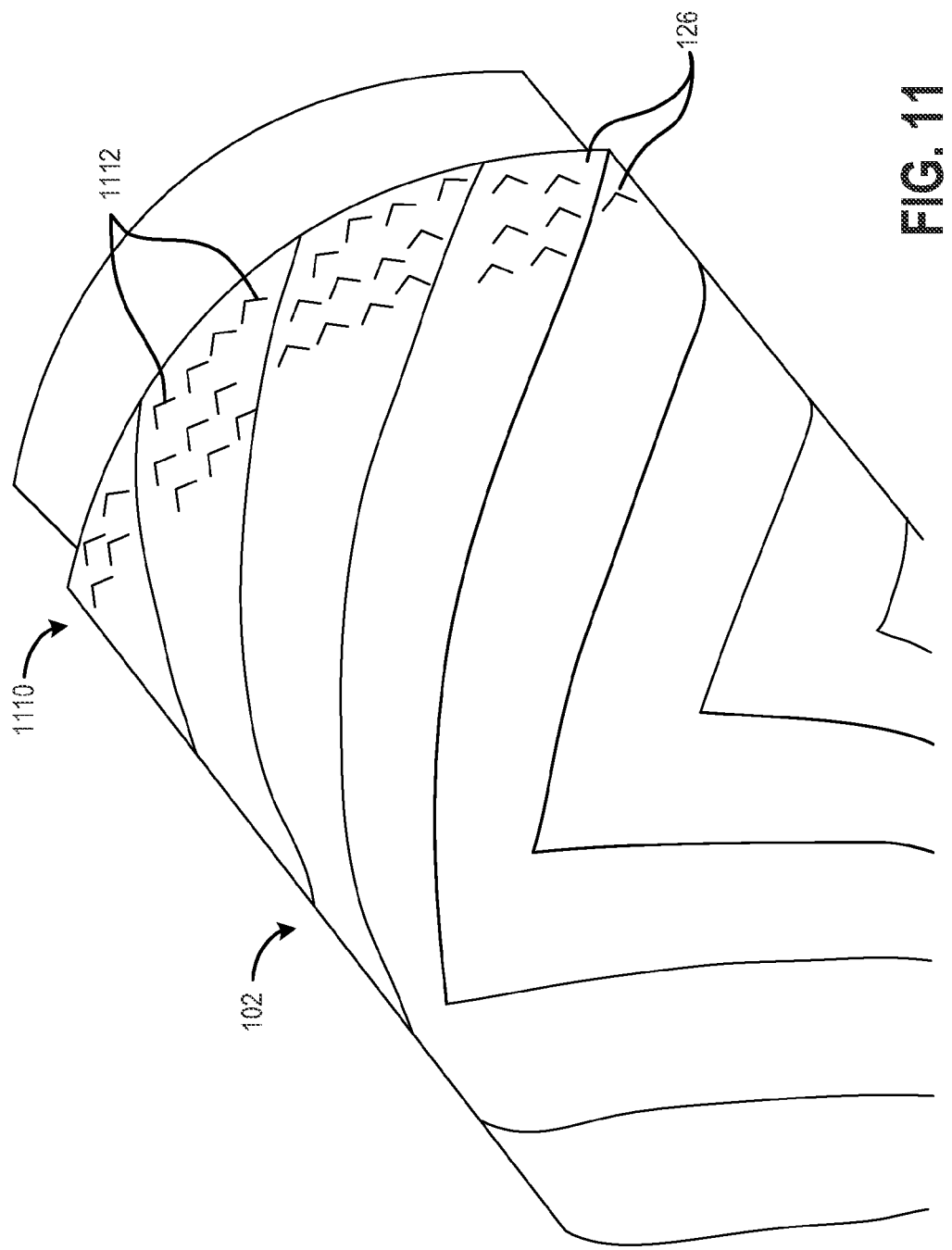

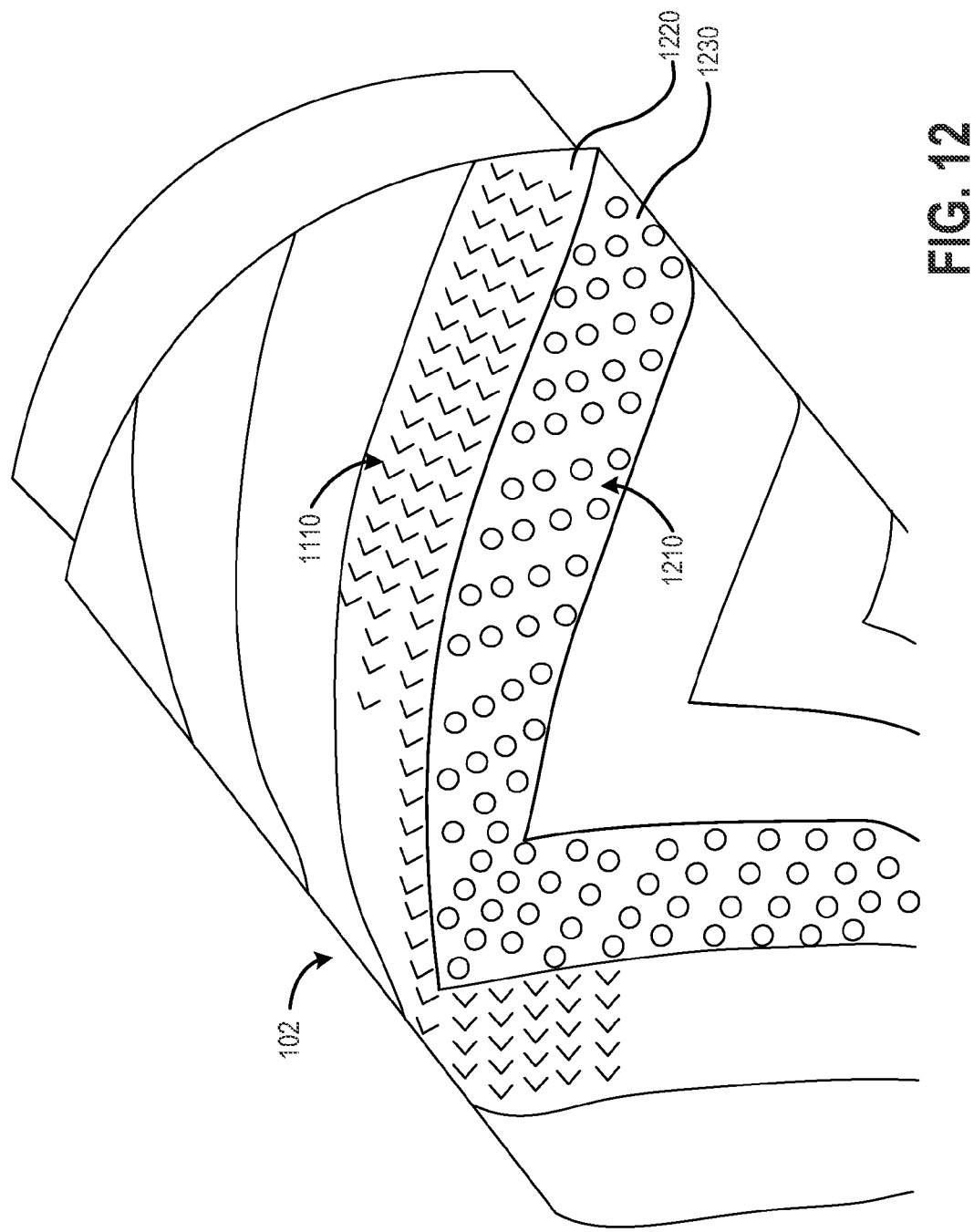

METHOD AND SYSTEMS FOR TEXTURING LIQUID BEARING SURFACES IN X-RAY TUBES

FIELD

Embodiments of the subject matter disclosed herein relate to applying singularly or in combination a number of coatings and textures to bearing assembly surfaces of an x-ray system.

BACKGROUND

X-ray systems may include an x-ray tube, a detector, and a support structure for the x-ray tube and the detector. In operation, an imaging table, on which an object is positioned, may be located between the x-ray tube and the detector. The x-ray tube typically emits radiation, such as x-rays, toward the object. The radiation passes through the object on the imaging table and impinges on the detector. As radiation passes through the object, internal structures of the object cause spatial variances in the radiation received at the detector. The detector then emits data received, and the system translates the radiation variances into an image, which may be used to evaluate the internal structure of the object. The object may include, but is not limited to, a patient in a medical imaging procedure and an inanimate object as in, for instance, a package in an x-ray scanner or computed tomography (CT) package scanner.

X-ray tubes may include a cathode and an anode located within a high-vacuum environment. The anode structure may be supported by a bearing to enable rotation by an induction motor. For example, the x-ray tube cathode may provide a focused electron beam that is accelerated across an anode-to-cathode vacuum gap to produce x-rays upon impact with the anode. Due to the high temperatures generated when the electron beam strikes the target, the anode assembly may rotate at high speed.

A liquid lubricated or liquid metal bearing may be employed to enable a high load capability and a high heat transfer, as well as low acoustic noise operation.

In one example, methods and systems are provided herein that include applying coatings and/or textures to select surfaces of the liquid bearing, and for example where the bearing surfaces contact the liquid lubricant.

In one embodiment, a bearing assembly comprises: a sleeve with an opening formed therein; a shaft positioned within the opening of the sleeve with a gap formed between an inner surface of the sleeve and an outer surface of the shaft; a lubricant disposed in the gap; and a texture formed on at least one of the outer surface of the shaft and/or the inner surface of the sleeve, the texturing altering the geometry and wettability of the inner and outer surfaces. In this way, the wettability properties of the bearing surfaces can be controlled via the textures such that desirable bearing performance is attained. Furthermore, the textures may be applied to the bearing surfaces at a lower cost than other features such as coatings, which may also utilize more complex manufacturing processes than those associated with the textures. Various other features and advantages will be made apparent from the following detailed description and the drawings.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIGS. 7-9 and 11-12 show several examples of texturing patterns for use with the bearing surfaces of FIGS. 3-6.

DETAILED DESCRIPTION

Figure 1:
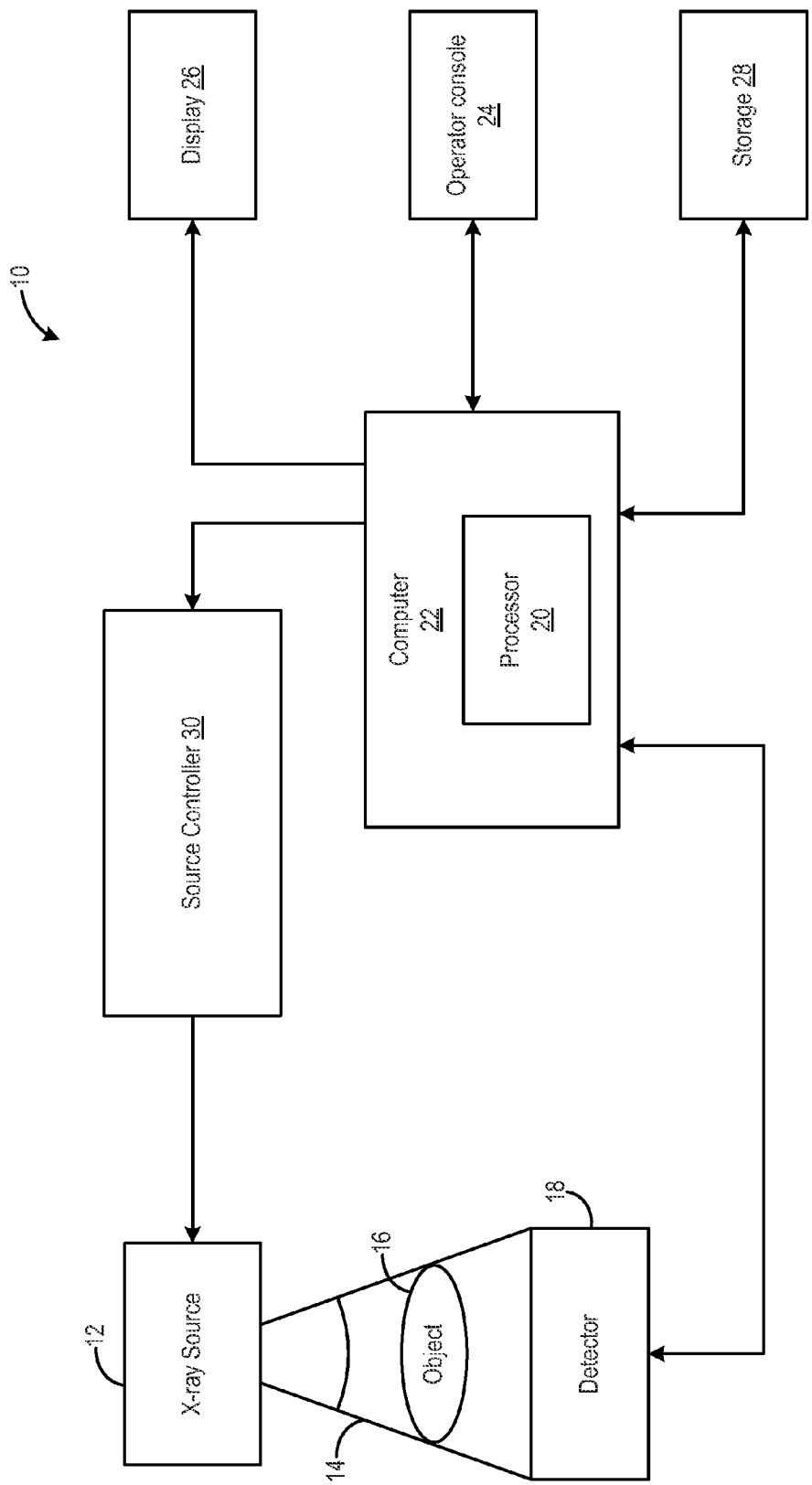
FIG. 1 shows a block diagram of an imaging system incorporating embodiments of the invention.

Liquid metals may be used as the lubricant in the liquid bearing. Materials such as gallium, indium, or tin alloys are typically used as the liquid metal, as they tend to be liquid at room temperature and have adequately low vapor pressure at operating temperatures to meet the rigorous high vacuum requirements of an x-ray tube.

Liquid metals tend to be highly reactive and corrosive. Thus, a base metal that is resistant to such corrosion is desirable for the bearing components. As such, a refractory metal such as molybdenum or tungsten is typically used as the base material for a liquid metal bearing. Not only are such materials resistant to corrosion, but they tend to be vacuum-compatible and thus lend themselves to an x-ray tube application. However, one concern that may be encountered in the use of a liquid metal is ensuring adequate wettability of bearing surfaces with the liquid metal. When adequate wettability does not occur, the liquid metal does not completely fill or lubricate the bearing and the liquid metal bearing may have insufficient fluid to operate as designed or run out of liquid metal during use, thus shortening the life of the x-ray tube.

Liquid lubricated bearings are also highly sensitive to takeoff and landing (acceleration and deceleration) events, which result in galling and wear on the bearing components and often constitute the failure mode of the bearing. To improve wear resistance and bearing performance a wear-resistant layer may be may be applied either to the moving or stationary surfaces of the bearing. The wear-resistant layers may, or may not, have poor wettability. If either the stationary or rotating surface is anti-wetting, then the bearing is considered "half-wetted". In these "half-wetted" bearings, the lubricant and the solid surfaces of the rotating and stationary components of bearing assembly are selected so the lubricant wets the surface of one of the bearing components, thus forming a no-slip boundary with the surface of one bearing component, and does not wet the opposing surface and thus can slip against the surface of other bearing component. The texturing of the land or sleeve, or some part of the land or sleeve (herein referring to the land as the outer surface of the grooved portion of the bearing) may be applied in such a way to increase the ability of that surface to have a greater surface tension affinity for the liquid metal, thus maintaining the fluid in the area of the landing to a lower speed, reducing the relative velocity of the surfaces at contact and thus reducing the wear and increasing the life of the tube.

While a "half-wetted" bearing design may mitigate galling and wear between bearing components, "half-wetted" bearings experience reduced load capability, potential stability issues, and lubricant containment issues due to the interaction between the wetted and non-wetted surfaces of the bearing components.

As described herein, methods and systems are provided that include applying coatings and/or textures to select surfaces of the liquid bearing.

FIG. 1 is a block diagram of an embodiment of an imaging system 10 designed both to acquire original image data and to process the image data for display and/or analysis in accordance with embodiments of the invention. It will be appreciated by those skilled in the art that various embodiments of the invention are applicable to numerous medical imaging systems implementing an x-ray tube, such as x-ray or mammography systems. Other imaging systems such as computed tomography (CT) systems and digital radiography (RAD) systems, which acquire image three dimensional data for a volume, also benefit from the invention. The following discussion of x-ray system 10 is merely an example of one such implementation and is not intended to be limiting in terms of modality.

As shown in FIG. 1, imaging system 10 includes an x-ray tube or source 12 configured to project a beam of x-rays 14 through an object 16. Object 16 may include a human subject, pieces of baggage, or other objects desired to be scanned. X-ray source 12 may be conventional x-ray tubes producing x-rays 14 having a spectrum of energies that range, typically, from 30 keV to 200 keV. The x-rays 14 pass through object 16 and, after being attenuated, impinge upon a detector assembly 18. Each detector module in detector assembly 18 produces an analog electrical signal that represents the intensity of an impinging x-ray beam, and hence the attenuated beam, as it passes through the object 16. In one embodiment, detector assembly 18 is a scintillation based detector assembly, however, it is also envisioned that direct-conversion type detectors (e.g., CZT detectors, etc.) may also be implemented.

A processor 20 receives the signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the x-ray system 10 and view the reconstructed image or other data from computer 22 on a display unit 26. Additionally, console 24 allows an operator to store the generated image in a storage device 28 which may include hard drives, floppy discs, compact discs, etc. The operator may also use console 24 to provide commands and instructions to computer 22 for controlling a source controller 30 that provides power and timing signals to x-ray source 12.

Figure 2:
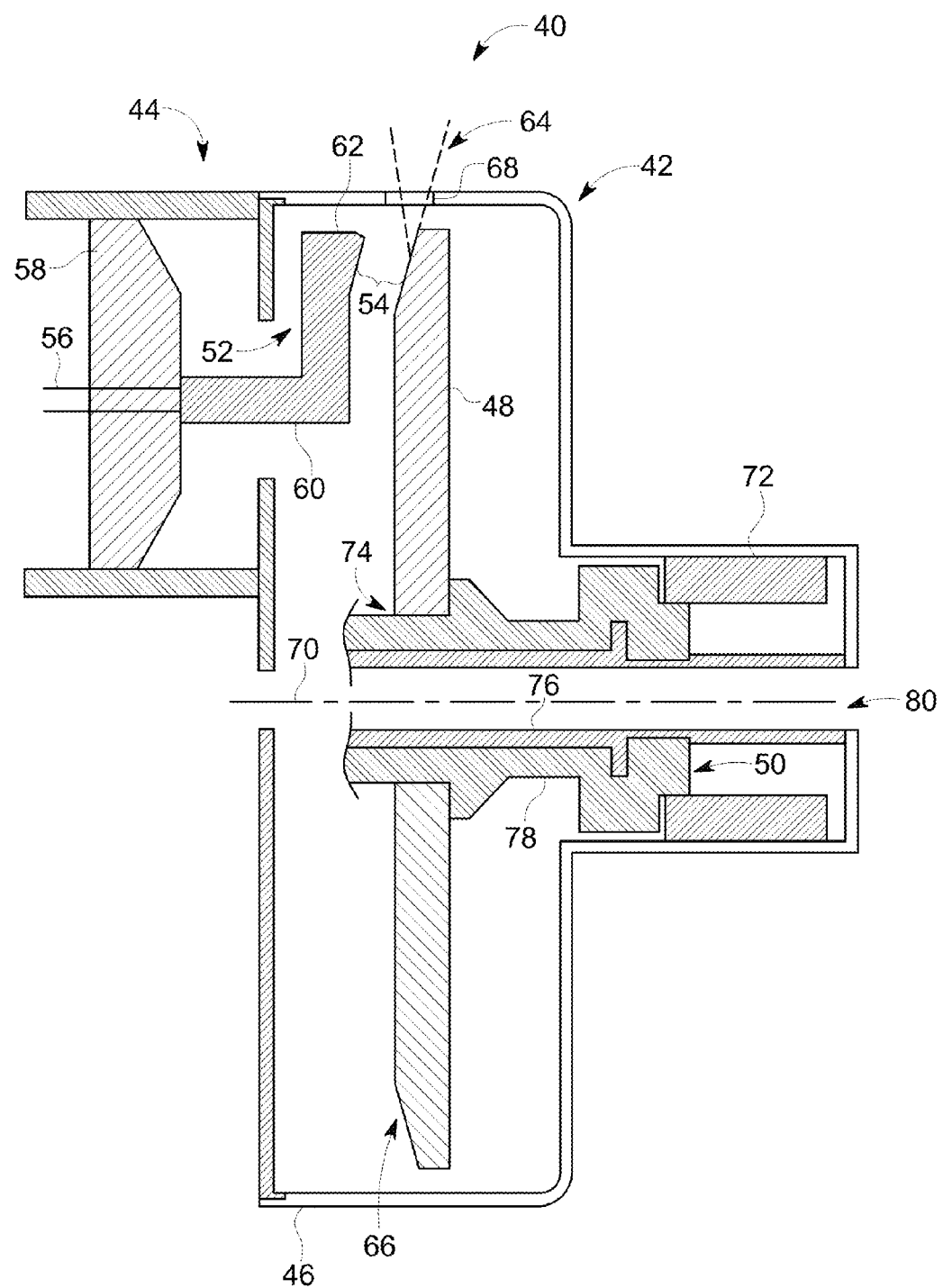
FIG. 2 shows a cross-sectional view of a portion of an x-ray tube according to an embodiment of the invention and useable with the system illustrated in FIG. 1.

FIG. 2 illustrates a cross-sectional view of an x-ray tube or x-ray source 40 incorporating embodiments of the invention. In the illustrated embodiment, x-ray source 40 includes an anode assembly 42 and a cathode assembly 44. X-ray tube 40 is supported by the anode and cathode assemblies 42, 44 within an envelope or frame 46, which houses a target or anode 48, a bearing assembly 50, and a cathode 52. Frame 46 defines an area of relatively low pressure (e.g., a vacuum) compared to ambient, in which high voltages may be present. Frame 46 may be positioned within a casing (not shown) filled with a cooling medium, such as oil, that may also provide high voltage insulation. While the target and anode are described above as being a common component of x-ray tube 40, the target and anode may be separate components in alternative x-ray tube embodiments.

In operation, an electron beam 54 is produced by cathode assembly 44. In particular, cathode 52 receives one or more electrical signals via a series of electrical leads 56. The electrical signals may be timing/control signals that cause cathode 52 to emit electron beam 54 at one or more energies and at one or more frequencies. The electrical signals may also at least partially control the potential between cathode 52 and anode 48. Cathode 52 includes a central insulating shell 58 from which a mask 60 extends. Mask 60 encloses electrical leads 56, which extend to a cathode cup 62 mounted at the end of mask 60. In some embodiments, cathode cup 62 serves as an electrostatic lens that focuses electrons emitted from a thermionic filament within cathode cup 62 to form electron beam 54.

X-rays 64 are produced when high-speed electrons of electron beam 54 are suddenly decelerated when directed from the cathode 52 to a target or focal surface 66 formed on target 48 via a potential difference therebetween of, for Example, 60 thousand volts or more in the case of CT applications. The x-rays 64 are emitted through a radiation emission passage 68 formed in frame 46 toward a detector array, such as detector 18 of FIG. 1.

Anode assembly 42 includes a rotor 72 and a stator (not shown) located outside x-ray source 40 and partially surrounding rotor 72 for causing rotation of anode 48 during operation. Target 48 is supported in rotation by a bearing assembly 50, which, when rotated, also causes target 48 to rotate about the centerline 70. As shown, target 48 has a generally annular shape, such as a disk, and an annular opening 74 in the center thereof for receiving bearing assembly 50.

Target 48 may be manufactured to include a number of metals or composites, such as tungsten, molybdenum, copper, or any material that contributes to Bermsstrahlung (i.e., deceleration radiation) when bombarded with electrodes. Target or focal surface 66 of target 48 may be selected to have a relatively high refractory value so as to withstand the heat generated by electrons impacting target 48. Further, the space between cathode assembly 44 and target 48 may be evacuated in order to minimize electron collisions with other atoms and to maximize an electric potential.

To avoid overheating of the target 48 when bombarded by the electrons, rotor 72 rotates target 48 at a high rate of speed (e.g., 90 to 250 Hz) about a centerline 70. In addition to the rotation of target 48 within x-ray tube volume 46, in a CT application, the x-ray source 40 as a whole is caused to rotate about an object, such as object 16 of imaging system 10 in FIG. 1, at rates of typically 1 Hz or faster.

Bearing assembly 50 comprises a liquid lubricated or self-acting bearing having adequate load-bearing capability and acceptable acoustic noise levels for operation within imaging system 10 of FIG. 1. As used herein, the terms "self-acting" and "self-lubricating" mean that the bearing lubricant remains distributed on the surfaces of the bearing due to the relative motion of the bearing components and absent an external pump.

In general, bearing assembly 50 includes a stationary portion, such as center shaft 76, and a rotating portion, such as sleeve 78 to which the target 48 is attached. While center shaft 76 is described with respect to FIG. 2 as the stationary portion of bearing assembly 50 and sleeve 78 is described as the rotating portion of bearing assembly 50, embodiments of the present invention are also applicable to embodiments wherein center shaft 76 is a rotary shaft and sleeve 78 is a stationary component. In such a configuration, target 48 would rotate as center shaft 76 rotates.

Center shaft 76 may optionally include a cavity or coolant flow path 80 though which a coolant 82 (FIG. 3), such as oil, may flow to cool bearing assembly 50. As such, coolant 82 enables heat generated from target 48 of x-ray source 40 (FIG. 2) to be extracted therefrom and transferred external to x-ray source 40. In straddle mounted x-ray tube configurations, coolant flow path 80 extends along a longitudinal length of x-ray source 40. In alternative embodiments, coolant flow path 80 may extend through only a portion of x-ray source 40, such as in configurations where x-ray source 40 is cantilevered when placed in an imaging system.

Figure 3:
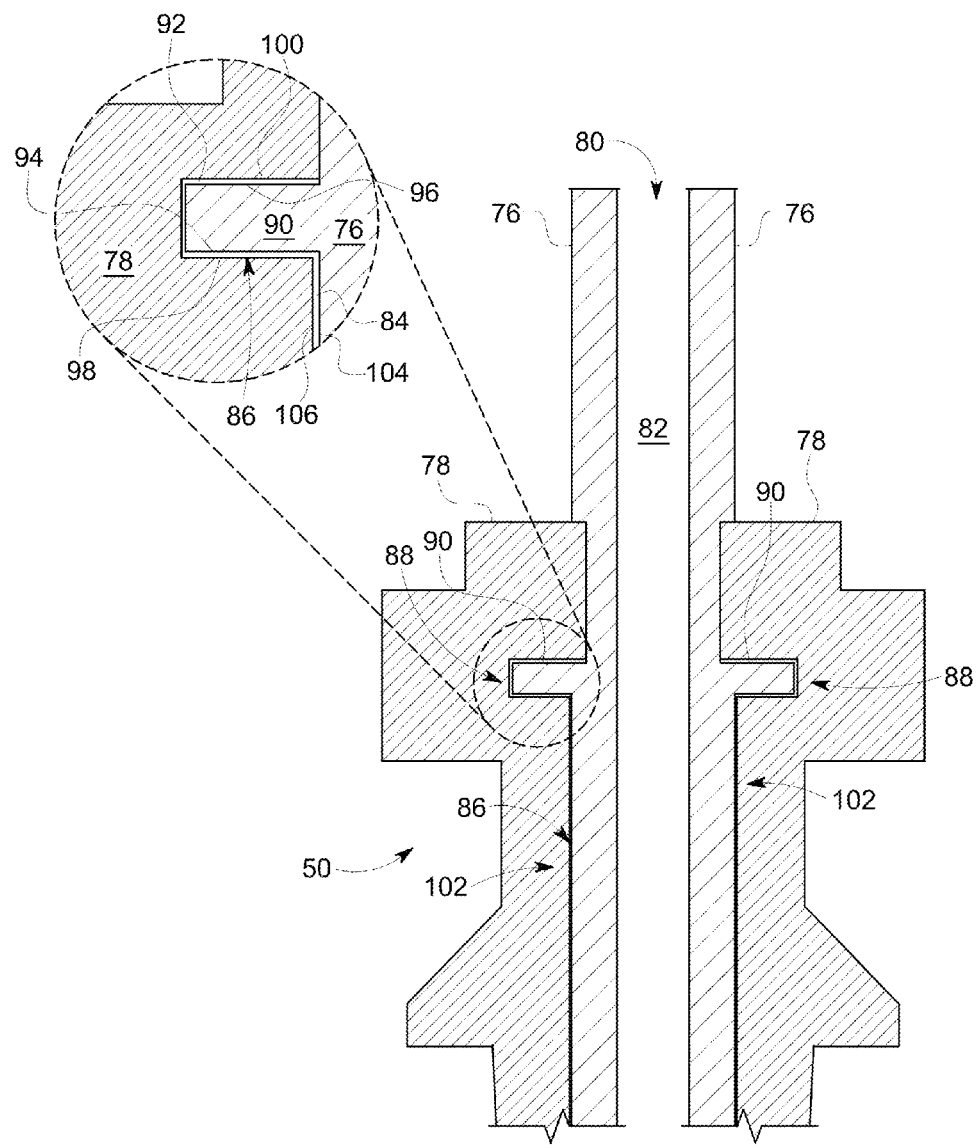
FIG. 3 shows a cross-sectional view of a liquid lubricated bearing according to an embodiment of the invention.

Referring now to FIG. 3, a cross-sectional view of a portion of bearing assembly 50 is shown according to an embodiment of the invention. Bearing assembly 50 includes a center shaft 76 positioned within sleeve 78, which is configured to support an anode (not shown), such as target 48 of FIG. 2. A lubricant 84 is positioned in a gap 86 formed between center shaft 76 and sleeve 78. In embodiments of the invention, lubricant 84 is a metal or metallic alloy that exists in a liquid state at operating temperature of bearing assembly 50.

The lubricating fluid 84 flowing between the rotating and stationary components of the bearing assembly 50 may include a variety of individual fluids as well as mixtures of fluids. For example, multiple liquid metals and liquid metal alloys may be used as the lubricating fluid, such as an indium gallium alloy. More generally, fluids with relatively low vapor pressures that are resistant to evaporation in vacuum-level pressures of the x-ray tube may be used. In the present context, low vapor pressures may generally be in the range of $1\times10^{-5}$ Torr. In other words, fluids that are stable in vacuums are desirable for use in x-ray tube systems so as to not adversely affect the established vacuum during operation of the system and to prevent evaporation of the necessary lubricating fluid. In the present disclosure, lubricant 84 may be gallium or a gallium alloy as non-limiting examples.

Exemplary base materials of center shaft 76 and sleeve 78 of bearing assembly 50 include ceramics, metals, and combinations thereof. In one embodiment, center shaft 76 and sleeve 78 are constructed of the same base material. Alternatively, the base materials of center shaft 76 and sleeve 78 may differ.

In the embodiment illustrated in FIG. 3, center shaft 76 of bearing assembly 50 is a stationary component and sleeve 78 is a rotatable component constructed to rotate about center shaft 76. However, one skilled in the art will recognize the inventive concepts described herein are applicable to alternative bearing configurations. As one example, bearing assembly 50 may instead include a stationary outer component and a rotating center shaft having a target attached thereto. As another example, bearing assembly 50 may be a "straddle" bearing that is configured to support a target between a first and a second liquid metal bearing. In other words, embodiments of this invention may be incorporated into any bearing configuration utilizing a liquid lubricated bearing to support an anode or target. Such configurations may include a stationary center shaft and a rotatable outer shaft, and vice versa. Further, one skilled in the art will recognize that such applications need not be limited to x-ray tubes, but may be applied to any configuration having a rotating component in a vacuum, the rotating component being supported by a liquid lubricated bearing. Thus, this invention is applicable to any bearing configuration having a rotatable component and a stationary component, and a liquid lubricant therebetween, regardless of configuration or application.

As illustrated in FIG. 3, center shaft 76 of bearing assembly 50 includes a thrust bearing portion 88 comprising a radial projection 90 that extends from center shaft 76 and is positioned in a radial cavity 92 of sleeve 78. Radial projection 90 of thrust bearing portion 88 includes a pair of outer race surfaces 94, 96 that face inner race surfaces 98, 100 of sleeve 78. In cantilever mount embodiments, sleeve 78 may also include a removable endcap (not shown) to allow assembly of components. Radial projection 90 limits axial motion of sleeve 78 relative to center shaft 76, and, as illustrated, lubricant 84 is also included between radial projection 90 and sleeve 78. Radial projection 90 need not be limited in axial length, but may be extended in axial length to provide additional mechanical support of components.

A radial or journal bearing portion 102 of bearing assembly 50 is located adjacent thrust bearing portion 88. An outer surface 104 of journal bearing portion 102 of center shaft 76 faces an inner surface 106 of journal bearing portion 102 of sleeve 78. While journal bearing portion 102 is illustrated on a first side of thrust bearing portion 88 adjacent outer race surface 94, one skilled in the art will recognize that bearing assembly 50 may include a second journal bearing portion located on a second side of thrust bearing portion 88 adjacent outer race surface 96. As described in more detail hereafter, various coatings, textures, and patterns including grooves embedded in the contacting surfaces of bearing assembly 50 may be applied to alter bearing behavior as the shaft 76 and sleeve 78 rotate relative to each other.

Bearing assembly 50 may be referred to as a spiral groove bearing due to the patterning of grooves along the various surfaces of the bearing. In some examples, the spiral groove may be formed from a logarithmic spiral shape. The spiral groove bearing may also be equivalently referred to as a fluid dynamic bearing and liquid bearing as well. In such spiral groove bearings, ways to contain the liquid lubricant 84 may be categorized in two general methods. The first includes providing physical barriers near the ends of the bearing where shaft seals would be placed in other applications. Rubber or other types of shaft seals in the presence of the vacuum inside the x-ray tube may function improperly, degrade quickly, and/or destroy the pressure inside the x-ray tube. In addition, many of the typical types of sealing materials may react with the liquid metal lubricant, compromising the sealing of the fluid within the bearing. For similar reasons, oil, grease, or other conventional means for aiding in rotational lubrication between two components may be undesirable because of the vacuum in the x-ray lube. Greases and other lubricants with higher vapor pressure than liquid metals may vaporize and destroy the vacuum. In some examples, physical walls of different shapes and sizes may be placed at different angles to capture the lubricant to reduce leakage through the bearing into the vacuum environment.

The second general method includes utilizing the capillary forces of the lubricant, wherein the small gap between two opposing bearing surfaces has anti-wetting properties through coating or texturing, which creates a gap that can withstand the fluid pressure through the surface tensions of the fluid to retain the fluid within the gap. In other words, the anti-wetting properties of the surface (via texturing, coating, or both) aids in preventing the lubricant from flowing in between the small gaps. It is actually the interface between the anti-wetting and the wetted area that creates the seal. The fluid boundary clings to the wetted surface up to the interface where the anti-wetting area begins. Then as the pressure pushes outward on the fluid surface, a convex meniscus forms where the surface tension of the fluid maintains the seal. In some examples, the surfaces are coated and/or textured to be more wetted such that the lubricant clings in the small gap to reduce lubricant moving through the gap. In other examples, the surfaces are coated and/or textured to be more anti-wetting such that the lubricant is pushed away from the small gaps near the ends of the bearing assembly. In this context, the small gap may be in the range of 50 microns.

Operation of liquid bearings in x-ray tube systems, such as bearing assembly 50 of FIGS. 2 and 3, may be at least partially dependent on a tradeoff between load carrying capacity and fluid pumping rate. In some examples, the load carrying capacity and fluid pumping rate are inversely proportional and directly related to geometry of the bearing grooves. For example, given a substantially constant rotational speed of the liquid bearing, deeper grooves may provide a higher pumping force, while the increased clearance between the shaft and sleeve can reduce the load carrying ability of the bearing. Pumping suction may be utilized to assist the containment of the lubrication fluid and anti-wetting coatings may be applied to sealing surfaces to further assist in containing the lubrication fluid.

The lubricating fluid in between bearing surfaces, such as the shaft and sleeve which are rotating relative to each other, is pumped in a hydrodynamic action. As such, the lubricating fluid is moved in a number of ways, including but not limited to, shearing, wedging, and squeezing, thereby creating pressures to lift and separate the shaft and sleeve from each other. This effect enables the liquid bearing to function and provide low-friction movement between the shaft and sleeve. In other words, the pumping is caused by the transfer of energy of the rotation into fluid velocity. The shearing of the fluid is the conversion of energy into heat through the molecular friction of the fluid. The shearing is in one sense an undesirable loss of energy requiring additional motor capacity to overcome the friction. Shearing of the lubricating fluid imparts energy into the fluid which causes the fluid to pump, wherein the pumping action into the gap between the shaft and sleeve is how the liquid bearing functions. Energy transfer from the surfaces to the fluid enables bearing functionality. In application, in the context of the x-ray tube, wetting between some bearing surfaces and the lubricating fluid allows shearing to impart energy to the fluid. However, anti-wetting between some bearing surfaces and the lubricating fluid allows friction between the bearing surfaces to be reduced, thereby reducing operating temperatures of the bearing assembly but may increase the risk of rotordynamic instability.

Interaction between the solid components of bearing assembly 50 and the lubricating fluid may be one factor in enabling proper function of the bearing. Precisely controlling the wettability of bearing surfaces may lead to improved bearing performance as well as simplifying the processing to improve manufacturability. As such, the inventors herein have proposed several wetting (and anti-wetting) textures to further enhance the wettability properties of the wetting or anti-wetting surfaces of liquid bearings such as bearing assembly 50 to modify the behavior of the lubricating fluid. By allowing for modification of the behavior of the lubricating fluid, different degrees of wetting could be provided in different areas of the bearing and be modified for different applications or configurations of the entire x-ray tube. For example, as described in more detail below, wetting and/or anti-wetting texturing could be provided near the bearing seals, or the area between the center shaft 76 and sleeve 78 prior to the end of the bearing assembly 50. In another example, with surfaces that are already anti-wetting or hydrophobic, texturing can be applied in the form of nano-particles to further increase the contact angle to form a superhydrophobic surface. Furthermore, in another example, surface textures could be applied that produce a graded wettability across the bearing surface in order to better contain and control lubricating fluid movement within the bearing assembly.

Wetting and anti-wetting textures may include a variety of materials and application procedures to alter the geometry of surfaces at a micron or nano-length scale. The affected surface altered by anti-wetting textures may be referred to as the textured surface. The textured surface has different wettability properties compared to the non-textured surface because the texturing affects the surface energy of the surface material. By applying specific surface morphologies, precisely tailored surface energies can be formed which directly affect wettability. In other words, the intrinsic hydrophobicity (i.e., wettability properties) of a surface can be enhanced through the application of texturing having different length scales of roughness along with shape.

Controlling the wettability between the lubricating fluid and base material may be desirable to control fluid movement and bearing behavior. In some x-ray systems and associated x-ray tube bearing assemblies, different base materials with different wettabilities are used to contain and dictate the behavior of lubricating fluid between the stationary and rotating components. Additionally, coatings may be applied to the base materials. For example, a non-wetting coating may be applied to act as a barrier to improve seals to reduce leakage of lubricant across the seals. However, use of the base material and coatings only may allow for a limiting degree of control over wettability, lubricant movement, and interaction between the lubricant and the coatings/base material. Furthermore, the manufacturing processes associated with applying the coatings to the base material may be complex and costly. Alternatively or in addition to the coatings and base material selection, texturing may be applied to the base material, which may involve simpler and more cost effective application processes than those used to apply the coatings. The texturing may be applied at micron or nano-length levels, for example, to make the base material surface wetting or anti-wetting depending on the desired bearing and lubricant behavior.

As described in detail with respect to FIGS. 4-9, a combination of an anti-wetting coating 108, an anti-wetting or wetting texturing, and patterns of grooves 110, 112, 114, 116 are formed on select surfaces of thrust bearing portion 88 and/or journal bearing portion 102 of bearing assembly 50 to prevent corrosion and/or wear of the base material of bearing assembly 50, reduce friction between bearing components, and facilitate flow of lubricant 84 in gap 86. In some examples, as presented below, different texturing and coatings may be applied to selectively facilitate and inhibit lubricant flow in different areas of the bearing. Grooves 110, 112, 114, and 116 may be referred to as macro grooves that are different than the micro or nano-length grooves applied during the texturing processes, as described in further detail below. The macro grooves are much larger than the micro grooves of the texturing. The material properties of lubricant 84, coating 108, texturing, and grooves 110, 112, 114, 116 interact to force lubricant 84 to remain between center shaft 76 and sleeve 78 during rotation of bearing assembly 50. As a result, lubricant 84 remains distributed about center shaft 76 during rotation of sleeve 78, thus improving its lubricating effects and increasing the load capacity of bearing assembly 50. However, one skilled in the art will recognize that anti-wetting coating 108 may be any material or surface that exhibits the above-described anti-wetting characteristics with respect to the bearing lubricant.

As used herein, the term "anti-wetting" refers to a hydrophobic-like material property of coating 108 that causes the surfaces of coating 108 to be non-wetted when in contact with lubricant 84. Furthermore, as used herein, the term "wetting" refers to a hydrophilic-like material property of coatings and textures that cause the surfaces to be wetted when in contact with lubricant 84. In particular, a surface is anti-wetting when the lubricant contact angle with the surface is equal to or greater than 90 degrees and is wetting when the contact angle is less than 90 degrees. Thus, a slip boundary is formed between anti-wetting coating 108 and lubricant 84. According to various embodiments, anti-wetting coating 108 may be, for example, Titanium Nitride, Titanium Oxide, or Titanium Oxynitride, a carbon coating such as graphite or diamond, or an oxide of the base material of bearing assembly 50. Anti-wetting coating 108 may also be a ceramic coating including carbides, oxides, nitrides, borides, silicides, and composites which may include a non-ceramic reinforcement. Alternatively, anti-wetting coating 108 may be a refractory metal coating such as niobium, molybdenum, tantalum, tungsten, rhenium, titanium, vanadium, chromium, zirconium, hafnium, ruthenium, osmium, iridium and their alloys including stainless steel whose surface is primarily chromium.

Figure 4:
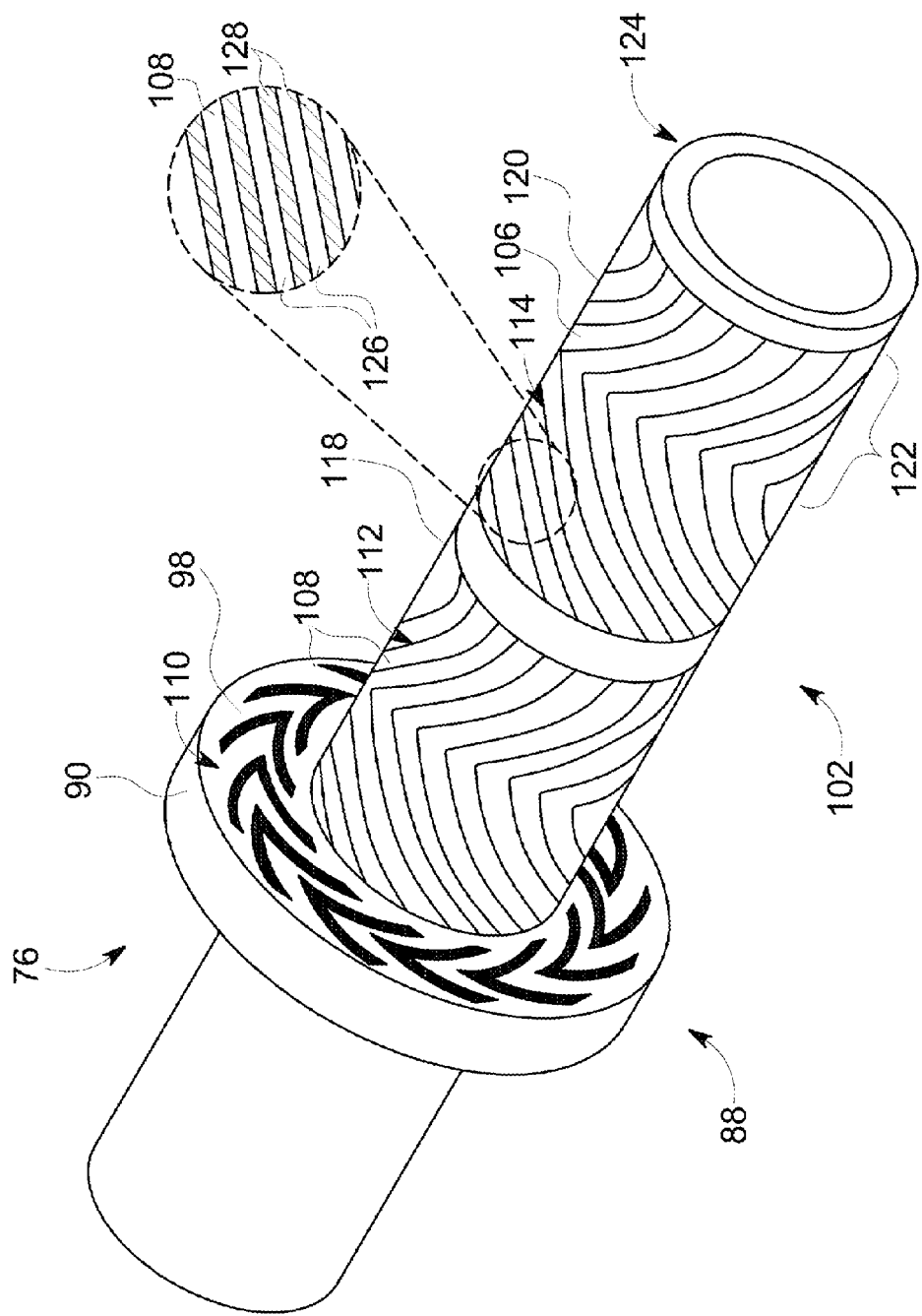
FIG. 4 shows a perspective view of the bearing shaft of the liquid lubricated bearing of FIG. 3 according to an embodiment of the invention.

Referring now to FIG. 4, a perspective view of center shaft 76 of bearing assembly 50 is illustrated according to an embodiment of the invention. As described below, various patterns of grooves 110, 112, 114 are formed on inner surface 106 of journal bearing portion 102 as well as inner race surfaces 98, 100 of thrust bearing portion 88 to facilitate lubrication of bearing assembly 50. In one embodiment, a first pattern of grooves 110 is formed on inner race surface 98 of thrust bearing portion 88. A groove pattern may be formed in a similar manner on inner race surface 100 (FIG. 3). A second groove pattern 112 is formed in a first half bearing 118 of journal bearing portion 102 and a third groove pattern 114 is formed in a second half bearing 120 of journal bearing portion 102.

While groove patterns 110, 112, 114 are illustrated in a herringbone geometry, one skilled in the art will recognize that groove patterns 110, 112, 114 may have alternate geometries such as, for example, helical spirals, straight and curved lines, dots, cross-hatching, and the like. Further, the location of the various groove patterns may differ based on design specifications and be non-symmetrical along the axial length of bearing assembly 50. As one example, third groove pattern 114 may be limited to a portion 122 of second half bearing 120 adjacent end 124 of center shaft 76.

Anti-wetting coating 108 is formed on the bearing or land surfaces 126 of thrust bearing portion 88 and journal bearing portion 102 between adjacent grooves of groove patterns 110, 112, 114. Anti-wetting coating 108 may cover all of the bearing surfaces of journal bearing portion 102 and/or thrust bearing portion 88 or only a portion thereof, according to various embodiments. In one embodiment, anti-wetting coating 108 is initially applied on inner surface 106 of journal bearing portion 102 and/or as inner race surfaces 98, 100 of thrust bearing portion 88 before groove patterns 110, 112, 114 are formed thereon. Groove patterns 110, 112, 114 are then formed by removing select portions of anti-wetting coating 108 corresponding to non-bearing or non-land surfaces 128 of thrust bearing portion 88 and journal bearing portion 102. Groove patterns 110, 112, 114 have a thickness at least equal to the thickness of anti-wetting coating 108, such that non-bearing surfaces 128 are substantially free of anti-wetting coating 108 and exhibit a wetting surface property with respect to lubricant 84. As used herein, a "wetting" surface property means that a lubricant contact angle with the surface is less than 90 degrees.

In an alternative embodiment, anti-wetting coating 108 is patterned on land surfaces 126 such that portions of non-bearing surfaces 128 corresponding to groove patterns 110, 112, 114 remain substantially free of anti-wetting coating 108. In such an embodiment, groove patterns 110, 112, 114 may be formed via selective application of the anti-wetting coating 108 without an additional machining step to remove excess anti-wetting coating 108.

Anti-wetting coating 108 is applied or formed, according to embodiments of the invention, by molten salt deposition, electroplating, chemical vapor deposition (CVD), PVD, plasma-enhanced PVD (PE-PVD), a laser-enhanced process (such as laser-enhanced net shaping known as LENS®, LENS® is a registered trademark of Sandia Corporation, Albuquerque, N. Mex.), cold spray, surface hardening techniques such as carburization, and combinations thereof. Anti-wetting coating 108 may be applied in thicknesses selected according to process conditions and desired outcomes.

In embodiments of the invention, anti-wetting coating 108 enables a post-machining or post-processing step to be performed thereon prior to final assembly of bearing assembly 50. The post-processing step may be used with any number of material removal techniques commonly known in the art, such as machining, acid-etch, laser etching, electro-chemical machining, and the like. In such embodiments, anti-wetting coating 108 is first applied having a thickness greater than, for instance, 0.1 micrometers, to facilitate and enable post-coating machining such that groove production (e.g., due to the machining process) occurs in the coating layer and not in the base metal. In other words, the coating or material is typically thick enough to enable cutting grooves in anti-wetting coating 108 and not in the base metal of center shaft 76. In addition, in embodiments that include applying anti-wetting coating 108 and then performing a post-machining step, one skilled in the art will recognize that initial tolerances of the base material may be relaxed, and that the post-machining step may include higher tolerance fine machining, thus decreasing the cost of processing by allowing for a lower tolerance part to be fabricated prior to application of anti-wetting coating 108. It is to be recognized that the processes described are but examples for application of coatings according to the invention, and that any number of coating processes may be employed for application of a coating according to the invention.

Because of the thicknesses capable from these processes, the processes likewise support a post-machining process according to the invention by enabling grooves to be cut from the applied material during post-machining Cold spray, for instance, may be used to apply anti-wetting coating 108 by propelling fine powder particles at high velocities using a compressed gas. The particles are relatively cold, so bulk reaction on impact is in solid state, and there is little to no oxidation. Because the particles typically do not melt during the process, there is relatively little shrinkage upon cooling of the base material. Molten salt deposition may be used to apply anti-wetting coating 108 to sufficient thicknesses as well. The process typically includes electrolytic deposition of a refractory metal such as molybdenum in a molten salt mixture. The salt mixture, in embodiments of the invention and as understood in the art, may include NaCl, KCl, and the like. During deposition, as understood in the art, the parts are cathodically polarized and the molten salt typically includes a source of ions of the refractory metal.

The thicknesses of anti-wetting coating 108 may be selected based on a desired life of the coating, based on the kinetic rate of corrosion that occurs in, for instance, molybdenum in the presence of liquid gallium, while taking into account operating temperatures and other factors that impact the rate of corrosion. In one embodiment of the invention, the final thicknesses of coating 108 is greater than 0.1 micrometers to provide adequate life of bearing assembly bearing assembly 50 during the life of x-ray source 40.

Figure 5:
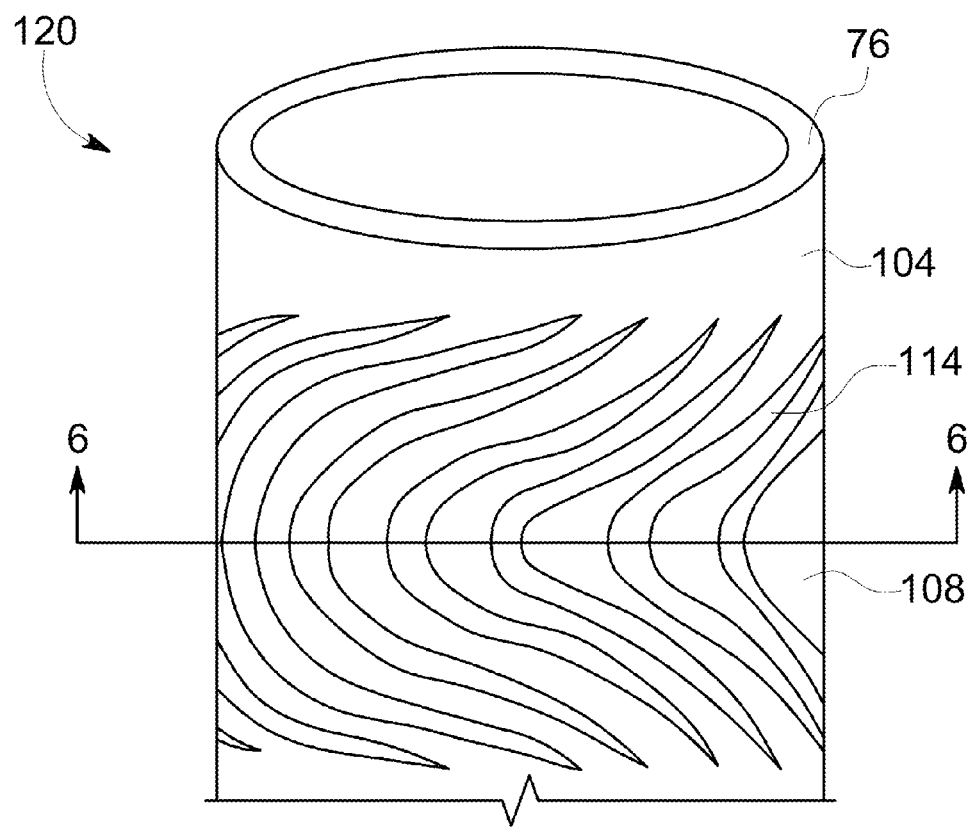
FIG. 5 shows a perspective view of a portion of the bearing shaft of FIG. 3.
Figure 6:
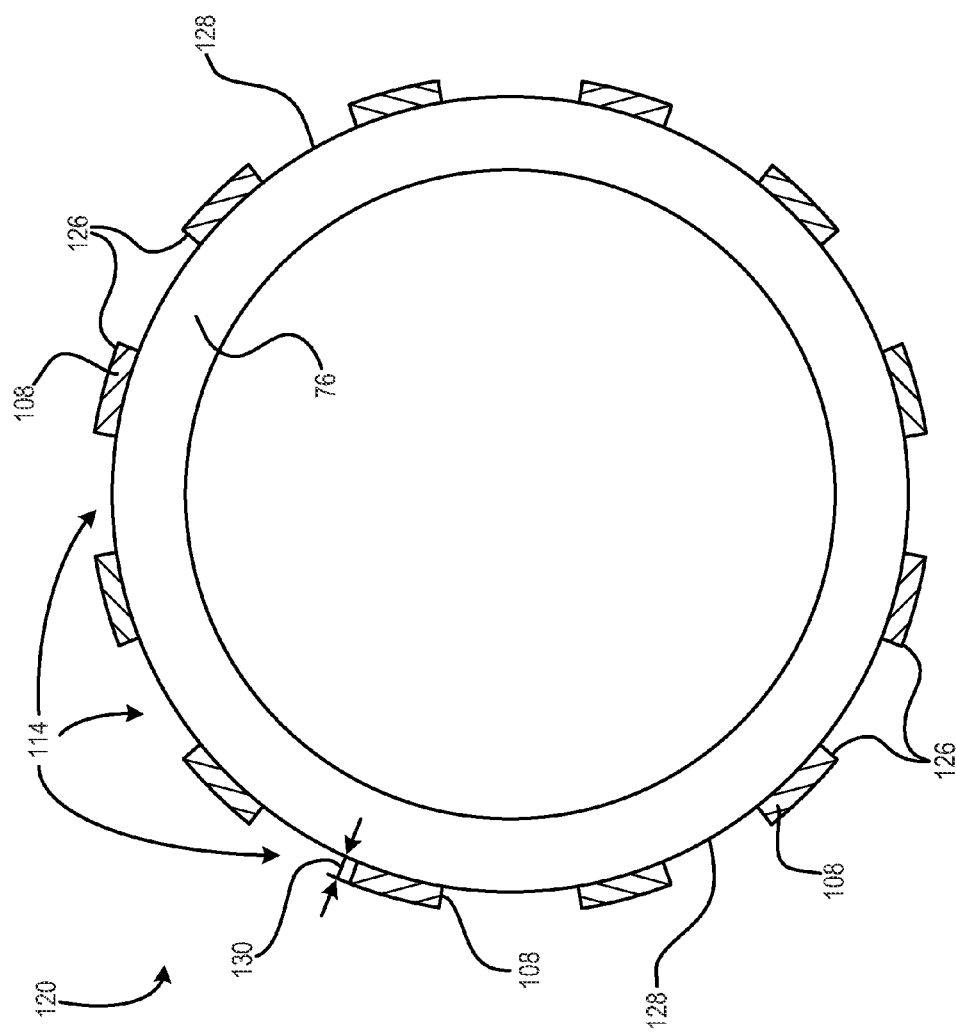
FIG. 6 shows a cross-sectional view the portion of the bearing shaft of FIG. 5.

A perspective view of a portion of second half bearing 120 is shown in perspective in FIG. 5 and in cross section in FIG. 6 to illustrate exemplary groove pattern 114 and anti-wetting coating 108 in additional detail. As shown, anti-wetting coating 108 exists on bearing or land surfaces 126 of outer surface 104 of center shaft 76 between adjacent grooves of groove pattern 114. Alternatively or in addition to coating 108, texturing may be applied to land surfaces 126 to further alter the surface properties of the bearing. Groove pattern 114 extends through a thickness 130 of anti-wetting coating 108 thereby exposing a non-coated portion of outer surface 104 of center shaft 76 corresponding to a non-bearing or non-land surface 128. The alternating configuration of anti-wetting bearing surfaces 126 and wetting non-bearing surfaces 128 on common surface of outer surface 104 of center shaft 76 facilitates containment of lubricant 84 (FIG. 3) within bearing assembly 50 and improves load capability as compared to a traditional "half-wetted" bearings, where one bearing component has a wetted surface and the other bearing component has a non-wetted surface.

While FIGS. 4-6 describe anti-wetting coating 108 and groove patterns 110, 112, 114 being formed on center shaft 76 of bearing assembly 50, groove patterns may be formed in an anti-wetting coating formed on the inner surface 106 of sleeve 78 of bearing assembly 50 in a similar manner.

In another embodiment, texturing may be applied to landings 126 of FIG. 6, wherein the texturing enhances the wetting of fluid on the landings. In other words, lubricating fluid over the lands may be increased due to the wetted (or hydrophilic) texturing. When the x-ray system is de-powering or otherwise decreasing in speed such that shaft sleeve 78 is also decreasing in rotational speed, pumping action maintaining separation between the sleeve 78 and shaft 76 decreases. As such, when enough pumping action is lost, the sleeve 78 and shaft 76 come into contact in an event known as landing. Landing occurs between landings 126 and the outer surface of sleeve 78. As such, with the wetting texturing of landings 126, lubricating fluid is held on the landings such that softer impact between the landings and sleeve 78 occurs compared to when less fluid is present on the landings. Moreover, wetting surfaces provided via texturing may reduce the amount of fluid leaving areas where the presence of fluid is beneficial during decreasing landing speed and decreasing pumping action, thereby also reducing the risk of damage and seizure of the bearing assembly components. Furthermore, when sustained operation of the x-ray system causes the bearing assembly to rotate for extending periods of time, centrifugal forces may push and pull the lubricating fluid to certain areas of the bearing, causing a non-uniform distribution of fluid throughout the bearing. Having some bearing areas textured to create a wetted interface may help retain the fluid in the areas where it belongs during extended rotation of the bearing assembly. Also, the wetted surfaces help flow the fluid back to where it belongs during the extended rotations when the fluid escapes to other areas.

Different processes may be used to texture surfaces of the base materials such as landing surfaces 126 of FIG. 6. In some x-ray systems, a nano-laser may be used to form nanoparticles and other nanostructures on the base materials. In other systems, nano-length or micro textures can be precisely machined or otherwise patterned into the base materials. A more involved process is electrostatic self-assembly. During electrostatic self-assembly, a base material such as a polymer may be exposed to an environment (such as a bath) of negatively-charged monomers. The monomers may adhere to the polymer to form a uniform layer of organic molecules with the negative charge. Next, the monomer-laden polymer may be exposed to another environment of positively-charged, nano-silica particles. The silica particles may attract to the negatively-charged monomers, thereby forming a layer of silica particles over the monomers. This process of exposure and alternating between layers of hard, ceramic nanoparticles and organic molecular monolayers may be repeated to obtain a desired surface structure. Due to the multiple steps involved, a high level of control over the wettability properties of the base surface can be exhibited. In other words, the wettability or non-wettability of the base material (as it interacts with the particular lubricant) via texturing can be precisely varied according to desired properties. In another manufacturing process, nano-sized features may be grown or laser machined in a particular fashion directly on the base material. A related manufacturing process includes laser micro-texturing, wherein lasers are used to modify metallic surfaces to make them anti-wetting or wetting for the control of liquid metals on those surfaces. Whether the surfaces are made anti-wetting or wetting may at least partially depend on geometrical features such as depth of the laser texturing as well as width, shape, and density of texturing.

It may beneficial to design components of the x-ray tube and bearing assembly such that they can withstand extreme conditions such as high pressures, high temperatures, and corrosive fluids. In particular, the texturing on the base material of the bearing assembly may at least partially aid in protecting the bearing against the extreme conditions.

From FIGS. 2-6, a bearing assembly is provided, comprising: a sleeve with an opening formed therein; a shaft positioned within the opening of the sleeve with a gap formed between an inner surface of the sleeve and an outer surface of the shaft; a lubricant disposed in the gap; and a texture formed on at least one of the outer surface of the shaft and the inner surface of the sleeve, the texturing altering the geometry and wettability of the inner and outer surfaces.

The bearing assembly further comprises a coating formed on at least one of the outer surface of the shaft and the inner surface of the sleeve, the coating altering the wettability of the inner and outer surfaces without altering the geometry of the inner and outer surfaces. Furthermore, the texture is positioned on a first portion of the inner and outer surfaces and the coating is positioned on a second portion of the inner and outer surfaces, the first and second portions located on different parts of the shaft and sleeve.

The texture and coating of the bearing assembly may also be positioned on a first portion of the inner and outer surfaces, and the texture may be cut into at least a section of the coating. In some embodiments, the liquid lubricant is in a liquid state when subjected to a vacuum. In another embodiment, the texture is positioned only on ends of the shaft and sleeve. In some examples, the texture includes a number of features cut into at least one of the outer surface of the shaft and the inner surface of the sleeve, and wherein a density of features is above a threshold. Alternatively, in other examples the texture includes a number of features cut into at least one of the outer surface of the shaft and the inner surface of the sleeve, and wherein a density of features is below a threshold. The threshold may be based on factors such as the base material, type of liquid lubricant, and gap in between the bearing surfaces, among others. Depending on the factors, a density lower than the threshold may correspond to a wetting relationship between the base material and lubricant while a density higher than the threshold may correspond to an anti-wetting relationship between the base material and lubricant. The opposite situation may occur depending on the factors.

While FIG. 6 shows a cross-sectional view of the shaft 76, FIGS. 7-9 and 11-12 show several example textures that may be applied to various surfaces of shaft 76 and sleeve 78. FIGS. 7-9 show zoomed in views of example textures. In particular, the length scales of the textures shown in FIGS. 7-9 and 11-12 may be on the scale of microns or even nanometers, depending on the particular application and desired wettability properties of the textured surfaces. Each texture may be applied to one or more portions of the bearing assembly 50, including but not limited to, landings 126, non-land surfaces 128, grooves 112, 114, and 116, inner race surfaces 98 and 100, and inner surface 106. Generally, the textures may be applied to any surface that is in contact with lubricating fluid 84. The particular geometries of each example texture is described hereafter in more detail.

FIG. 7 shows a grid texture 710 on the left side and an interlocking texture 720 on the right side. The grid texture 710 comprises a series of first linear grooves 712 arranged in a parallel fashion such that the grooves do not intersect. A series of second linear grooves 714, similar to grooves 712, run parallel but intersect the first grooves 712 at substantially 90 degree angles, forming perpendicular intersections. The intersection of grooves 712 and 714 form the grid of the texture 710. Areas located in between grooves 712 and 714 may be referred to as rectangular areas 711. Although not apparent from the viewing angle of FIG. 7, the depths of first grooves 712, second grooves 714, and rectangular areas 711 may be substantially the same or different. In one example, both grooves 712 and 714 share a similar depth while the rectangular surfaces 714 have substantially no depth, thereby allowing lubricating fluid to flow through the grooves. In another example, the opposite situation occurs where the rectangular surfaces have a greater depth than the grooves 712 and 714.

It is noted that grooves 712 and 714 may be defined by removal of material from the base surface in some examples, while in other examples the grooves may be defined by the addition of material to form ridges. The ridges may protrude from the base surface such that lubricating fluid falls from the ridges and collects in rectangular areas 711. By adjusting the addition or removal of material along with the relative depths to form grid texture 710, it can be seen that different fluid behavior can be achieved as it comes into contact with the texture while maintaining the same general shape shown in FIG. 7.

Referring to FIG. 7, the interlocking texture 720 features a more irregular pattern than grid texture 710. The interlocking texture 720 comprises a series of linear channels 725 that are generally not parallel and intersect other linear channels at angles varying from 0 to 180 degrees. Furthermore, the linear channels 725 include a variety of widths and lengths, forming a substantially randomized pattern as seen in FIG. 7. The areas in between the linear channels 725 may be referred to as protrusions 726. Similar to grid texture 710, the channels 725 and protrusions 726 may be defined by material removal, addition, or a combination of both.

A boundary 750 is shown extending across interlocking texture 720, wherein the boundary defines a shift in channel density across the interlocking texture. The boundary 50 separates a first area 728 from a second area 729, wherein the first area contains fewer channels 725 than the second area. The channel density may be conversely defined by the combined area of protrusions 726. The second area 729 contains more channels 725 and less combined protrusion area than the first area. The shift in feature density across boundary 750 may allow interlocked texture 710 to gradually shift wettability properties of the base material in a more gradual manner than if the texture were abruptly changed. The gradual shift in wettability may be conducive to certain applications wherein both anti-wetting and wetting characteristics are desired.

FIG. 8 shows two additional base material surface textures, including a uniform nanoparticle texture 840 and a varied nanoparticle texture 860. The uniform nanoparticle texture 840 comprises the exposed base material 805 and a plurality of nanoparticles 807. The base material 805 may include only the base metal used to manufacture the surface, or can include one or more of the aforementioned coatings. The plurality of nanoparticles 807 share substantially the same shape and size, and may be distributed in an even density as seen in FIG. 8. In other examples, a graded density may include providing more nanoparticles in some areas of the base material 805 than in others.

The varied nanoparticle texture 860 of FIG. 8 comprises the exposed base material 806 and a plurality of nanoparticles 808 and 809. Similar to uniform nanoparticle texture 840, base material 806 may include a wetting or anti-wetting coating to further enhance the desired surface properties of the varied nanoparticle texture 860. Texture 860 includes nanoparticles of varying size. For example, smaller nanoparticles 808 may be dispersed around larger nanoparticles 809, wherein the larger nanoparticles comprise larger dimensions than the smaller nanoparticles. Furthermore, the shapes between the nanoparticles may vary as seen in FIG. 8. Some nanoparticles may be generally spherical while others are stretched in one or more directions and/or include other features such as additional indents or protrusions. The surface properties affecting the wettability of the base material of texture 840 and 860 may be adjusted by altering a number of parameters, including nanoparticle density, size, shape, and material.

FIG. 9 shows additional examples of textured patterns, including a non-linear grooved texture 970 and hybrid texture 980. The non-linear grooved texture 970 comprises a number of generally curved, non-linear grooves 971 separated by areas of exposed base material 972. The non-linear grooves 971 traverse the base material along a single direction such that intersection between the grooves does not occur. The grooves 971 may also be of varying thickness and shape, wherein some may comprise generally sinusoidal shapes while others comprise single, gradually-extending curves in some examples. The hybrid texture 980 comprises the base material 985, linear channels 983, and nanoparticles 984. The channels 983, as seen in FIG. 9, are substantially linear and parallel such that intersection between the channels does not occur. Furthermore, the nanoparticles 984, dispersed in between the linear channels 983, are of varying shapes and sizes. The combination of channels 983 and nanoparticles 984 may further aid in altering the surface properties of base material 985 to interact with the lubricating fluid in the desired manner.

FIG. 11 shows an additional example of a textured pattern, including a hydrophilic texture 1110. The hydrophilic texture 1110 comprises a plurality of chevron-shaped grooves 1112 separated by areas of exposed base material. The chevron-shaped grooves may be aligned equally or unequally and may be spaced evenly apart or unevenly apart, or may be arranged in another configuration. As shown, the chevron-shaped grooves each point in the same relative direction; however, in some embodiments different grooves may point in different relative directions. The hydrophilic texture may be present on the entirety of the journal bearing portion 102, or on a portion of the journal bearing portion. As shown in FIG. 11, the hydrophilic pattern is on the end of the shaft to hold gallium on the landings 126 at low speed. In another configuration, shown in FIG. 12, the hydrophilic texture 1110 is located on a landing 1210, while a different texture, herein illustrated as a nanoparticle texture 1220, is located on a different landing 1230. The hydrophilic texture comprises a plurality of chevron-shaped grooves, similar to the texture illustrated in FIG. 11. The hydrophilic texture may extend over the entire landing, or only a portion of the landing (as illustrated). Further, while only two landings are depicted as including a respective texture, it is to be understood that in some embodiments, each landing may include a respective texture. For example, every other landing may include the hydrophilic texture, with each remaining landing including the nanoparticle texture.

FIGS. 7-9 and 11-12 along with the previous figures provide an x-ray tube, comprising: a cathode; a target assembly positioned to receive electrons emitted from the cathode; and a self-lubricating bearing configured to support the target assembly, the self-lubricating bearing comprising: a rotatable component having a first surface; a stationary component positioned with respect to the rotatable component such that a gap is formed between the first surface of the rotatable component and a first surface of the stationary component; a liquid lubricant disposed within the gap; and a texture formed on at least one of the first surface of the rotatable component and the first surface of the stationary component. The x-ray tube may further comprise a coating on at least one of the first surface of the rotatable component and the first surface of the stationary component. Furthermore, in one embodiment, the coating is only on a first portion of the first surface of the rotatable component and the first surface of the stationary component, and the texture is only on a second portion of the first surface of the rotatable component and the first surface of the stationary component, the first and second portions located on opposite ends of the self-lubricating bearing.

With the above x-ray tube, the coating may include a coating material applied to a base material of the first surface of the rotatable component and the first surface of the stationary component, the coating material adhering to the base material to form a bonded structure. Also, the texture includes grooves in the base material in a first area and ridges in the base material in a second area, the grooves penetrating the base material and the ridges rising above the base material. In some embodiments, the stationary component is a shaft and the rotatable component is a sleeve, while in other embodiments the stationary component is a sleeve and the rotatable component is a shaft. Lastly, the liquid lubricant may maintain separation between the stationary component and rotatable component when the rotatable component is rotating.

Figure 10:
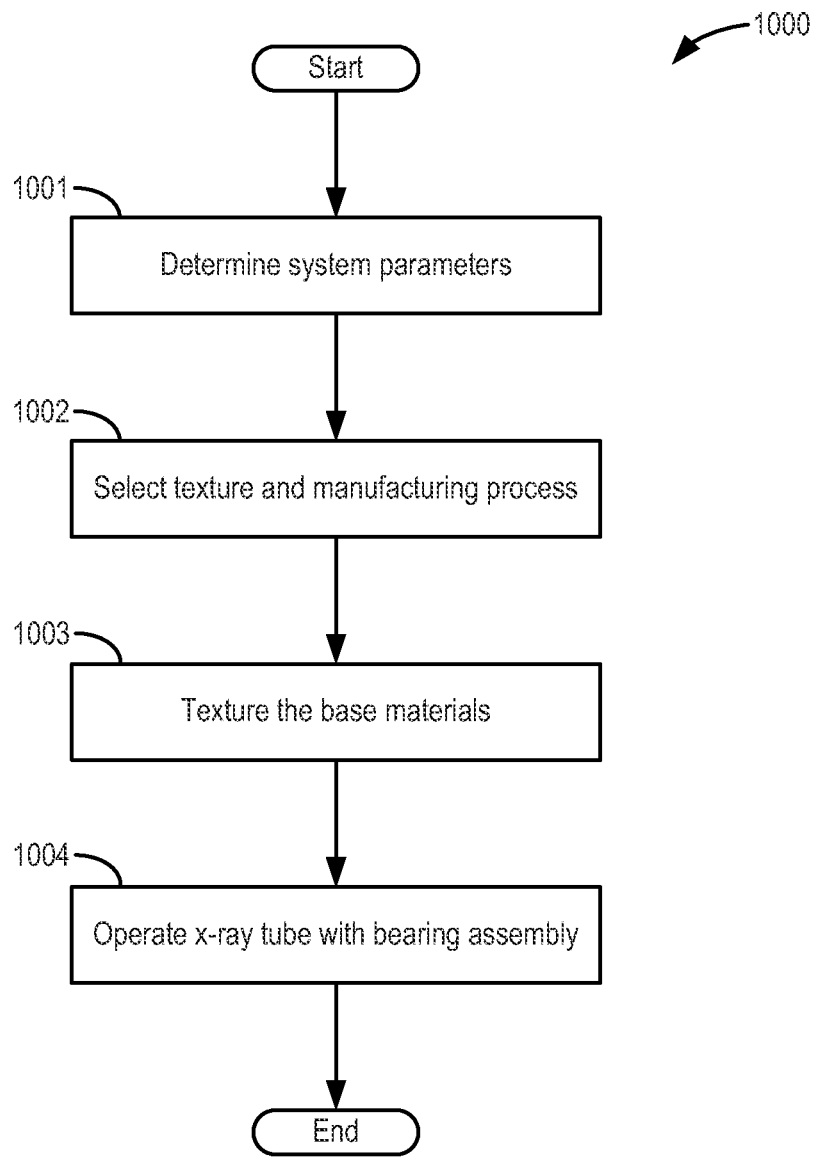
FIG. 10 shows a method for selecting and applying texturing patterns to surfaces of the bearing assembly of FIGS. 3-6.

FIG. 10 shows a method 1000 for selecting texturing to apply to the base material of the bearing assembly before inserting the assembly into the x-ray system for operation. First, at 1001, the method includes determining a number of system parameters. The system parameters may include rotational speed of the bearing assembly, materials used in the x-ray system, type of lubricating fluid, desired pumping force, desired friction and temperature, and presence of larger grooves on the bearing surfaces, among others. Next, at 1002, the method includes selecting a texture and suitable manufacturing process for applying the texture based on the system parameters. The texture may include one of those shown and described with regard to FIGS. 7-9 or other textures not shown herein. For example, for a texture involving application of nanoparticles, a manufacturing process involving lasers may be used to distribute the nanoparticles along the base material.

Next, at 1003, the method includes texturing the base materials with the selecting texture. In some examples, all surfaces of the bearing in contact with the lubricating fluid may be exposed to the texturing, while in other examples only select surfaces of the bearing may be exposed to the texturing. Finally, at 1004, the method includes operating the x-ray tube with the bearing assembly positioned inside the x-ray tube. With the selected texturing and distribution of the texturing, the desired wettability properties of the base material may be achieved to result in the desired pumping action, lubrication, and friction of the bearing assembly.

FIG. 10 and previous provide a method for bearing assembly, comprising: applying a plurality of textures and a plurality of coatings to surfaces of a stationary component and a rotatable component based on a desired wettability of the surfaces, the textures altering the geometry of the surfaces and the coatings adhering a first material to a second material of the surfaces. The method further comprises applying the plurality of textures in a first portion of the surfaces and applying the plurality of coatings in a second portion of the surfaces, the first portions adjacent to the second portions. Furthermore, the wettability can be graded across the surfaces of the stationary component and the rotatable component. Additionally, applying the plurality of textures and the plurality of coatings further includes etching grooves into the surfaces, the grooves at a different length scale than the textures. Lastly, the length scale of the textures is less than microscopic.

To adequately lubricate the bearing while optimizing pumping force generated, it may be desirable to attract the lubricating fluid in some areas of the bearing while repelling it in other areas, otherwise known as wetting and anti-wetting, respectively, as described previously. If the lubricating fluid were water-based, then wetting may be interchangeable with hydrophilic while anti-wetting may be interchangeable with hydrophobic.

The inventors herein have proposed that in addition to the aforementioned coatings or by itself, texturing be provided to the surfaces to provide further wetting and/or anti-wetting properties to a selection of the bearing surfaces. In other words, the coatings and texturing may be used alone or in combination to precisely control how certain areas of the bearing surfaces interact with the lubricating fluid. Furthermore, in another embodiment, the bearing may include both wetting and anti-wetting surfaces generated via texturing only and not coatings. In yet another embodiment, the texturing may be applied in the same areas of the coatings, thereby further enhancing the wetting or anti-wetting properties of the surface.

In this way, the variety of anti-wetting textures described above and others may be applied to existing anti-wetting surfaces with standard techniques to modify surface energy properties of the anti-wetting surfaces. The standard techniques may include, but are not limited to, electrochemical etching, electrostatic self-assembly, chemical surface reaction, and thermal treatments. The anti-wetting textures may further achieve the technical effect of changing the wetting behavior of the liquid lubricant on surfaces of the bearing assembly and be used to improve overall bearing performance. Furthermore, texture-based changes to the bearing may allow for the relaxation of otherwise tight geometrical tolerances to reduce manufacturing cost and/or improve inventory carry value (ICV) of the bearing components. Related, the simplification of manufacturing may lead to simplified bearing assemblies to also reduce cost and/or improve ICV. The textures or textures and coatings may improve lubricant containment, mitigate galling, and improve wear resistance of the liquid lubricated bearing assembly. Lastly, the net costs associated with fabricating the liquid lubricated bearing may be reduced.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A bearing assembly, comprising:
   a sleeve with an opening formed therein;
   a shaft positioned within the opening of the sleeve with a gap formed between an inner surface of the sleeve and an outer surface of the shaft;
   a lubricant disposed in the gap; and
   a texture formed on at least one of the outer surface of the shaft and the inner surface of the sleeve, the texturing altering a geometry and wettability of the inner and outer surfaces, wherein a length scale of the texture is less than microscopic.

2. The bearing assembly of claim 1, further comprising a coating formed on at least one of the outer surface of the shaft and the inner surface of the sleeve, the coating altering the wettability of the inner and outer surfaces without altering the geometry of the inner and outer surfaces.

3. The bearing assembly of claim 2, wherein the texture is positioned on a first portion of the inner and outer surfaces and the coating is positioned on a second portion of the inner and outer surfaces, the first and second portions located on different parts of the shaft and sleeve.

4. The bearing assembly of claim 2, wherein the texture and coating are positioned on a first portion of the inner and outer surfaces, and the texture is cut into at least part of the coating.

5. The bearing assembly of claim 1, wherein the texture is only formed on ends of the shaft and/or sleeve.

6. The bearing assembly of claim 1, wherein the texture includes a number of features cut into at least one of the outer surface of the shaft and/or the inner surface of the sleeve, and wherein a density of features is above a threshold.

7. The bearing assembly of claim 1, wherein the texture includes a number of features cut into at least one of the outer surface of the shaft and the inner surface of the sleeve, and wherein a density of features is below a threshold.

8. An x-ray tube, comprising:
   a cathode;
   a target assembly positioned to receive electrons emitted from the cathode; and
   a self-lubricating bearing configured to support the target assembly, the self-lubricating bearing comprising:
      a rotatable component having a first surface;
      a stationary component positioned with respect to the rotatable component such that a gap is formed between the first surface of the rotatable component and a first surface of the stationary component;
      a liquid lubricant disposed within the gap; and
      a texture formed on at least one of the first surface of the rotatable component and the first surface of the stationary component, wherein a length scale of the texture is less than microscopic.

9. The x-ray tube of claim 8, further comprising a coating on at least one of the first surface of the rotatable component and the first surface of the stationary component.

10. The x-ray tube of claim 9, wherein the coating is only on a first portion of the first surface of the rotatable component and the first surface of the stationary component, and the texture is only on a second portion of the first surface of the rotatable component and the first surface of the stationary component, the first and second portions located on opposite ends of the self-lubricating bearing.

11. The x-ray tube of claim 9, wherein the coating includes a coating material applied to a base material of the first surface of the rotatable component and the first surface of the stationary component, the coating material adhering to the base material to form a bonded structure.

12. The x-ray tube of claim 11, wherein the texture includes grooves in the base material in a first area and ridges in the base material in a second area, the grooves penetrating the base material and the ridges rising above the base material.

13. The x-ray tube of claim 8, wherein the stationary component is a shaft and the rotatable component is a sleeve.

14. The x-ray tube of claim 8, wherein the stationary component is a sleeve and the rotatable component is a shaft.

15. The x-ray tube of claim 8, wherein the liquid lubricant maintains separation between the stationary component and rotatable component when the rotatable component is rotating.

16. A method for manufacturing a bearing assembly, comprising:
applying a plurality of textures and a plurality of coatings to surfaces of a stationary component and a rotatable component based on a desired wettability of the surfaces, the textures altering a geometry of the surfaces and the coatings adhering a first material to a second material of the surfaces, wherein a length scale of the textures is less than microscopic.

17. The method of claim 16, further comprising applying the plurality of textures in a first portion of the surfaces and applying the plurality of coatings in a second portion of the surfaces, the first portions adjacent to the second portions.

18. The method of claim 16, further comprising grading the wettability across the surfaces of the stationary component and the rotatable component.

19. The method of claim 16, wherein applying the plurality of textures and the plurality of coatings further includes etching grooves into the surfaces, the grooves at a different length scale than the length scale of the textures.

20. The method of claim 16, wherein the textures are applied via one of a laser, electrostatic self-assembly, chemical surface reaction, and thermal treatments.

* * * * *